(12) United States Patent
Moratt et al.

(10) Patent No.: US 7,724,683 B2
(45) Date of Patent: May 25, 2010

(54) ARRANGEMENTS FOR CONTROLLING MULTIPLE MAC INTERFACES

(75) Inventors: Yoav Moratt, Haifa (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 11/694,998

(22) Filed: Mar. 31, 2007

(65) Prior Publication Data

US 2008/0240092 A1 Oct. 2, 2008

(51) Int. Cl.
*H04W 4/00* (2009.01)
(52) U.S. Cl. .......................... 370/252; 370/338; 370/468
(58) Field of Classification Search ................ 370/252, 370/242, 419, 463, 389, 468, 338, 230, 235, 370/329, 336, 345, 347, 431, 442
See application file for complete search history.

(56) References Cited

U.S. PATENT DOCUMENTS

2007/0150584 A1* 6/2007 Srinivasan .................. 709/224
2007/0171917 A1* 7/2007 Dai ........................ 370/395.53
2007/0253352 A1* 11/2007 Arisha et al. ................ 370/328
2008/0013640 A1* 1/2008 Lu et al. ..................... 375/261
2008/0089311 A1* 4/2008 Roy et al. ................... 370/345

* cited by examiner

*Primary Examiner*—Brian D Nguyen
(74) *Attorney, Agent, or Firm*—Schubert Osterrieder & Nickelson PLLC; Jeffery Schubert

(57) ABSTRACT

Arrangements for controlling multiple media access control interfaces are disclosed. In one embodiment a method for controlling the interfaces can include setting up a transmission configuration for a first and a second media access control (MAC) interface, sending a transmission utilizing the first MAC interface and sending a transmission utilizing the second MAC interface. During subsequent communications communication performance parameters can be determined that are related the "multi"-MAC transmissions. Based on the communication performance parameters the transmission configuration of the first MAC interface and the second MAC interface can be modified to improve communication performance.

18 Claims, 2 Drawing Sheets

ARRANGEMENTS FOR CONTROLLING MULTIPLE MAC INTERFACES

FIELD

The present disclosure is related to the field of electronics and more particularly to arrangements for multiple media access control systems.

BRIEF DESCRIPTION OF THE DRAWINGS

Aspects of the disclosure will become apparent upon reading the following detailed description and upon reference to the accompanying drawings in which, like references may indicate similar elements.

DETAILED DESCRIPTION OF EMBODIMENTS

Figure 1:
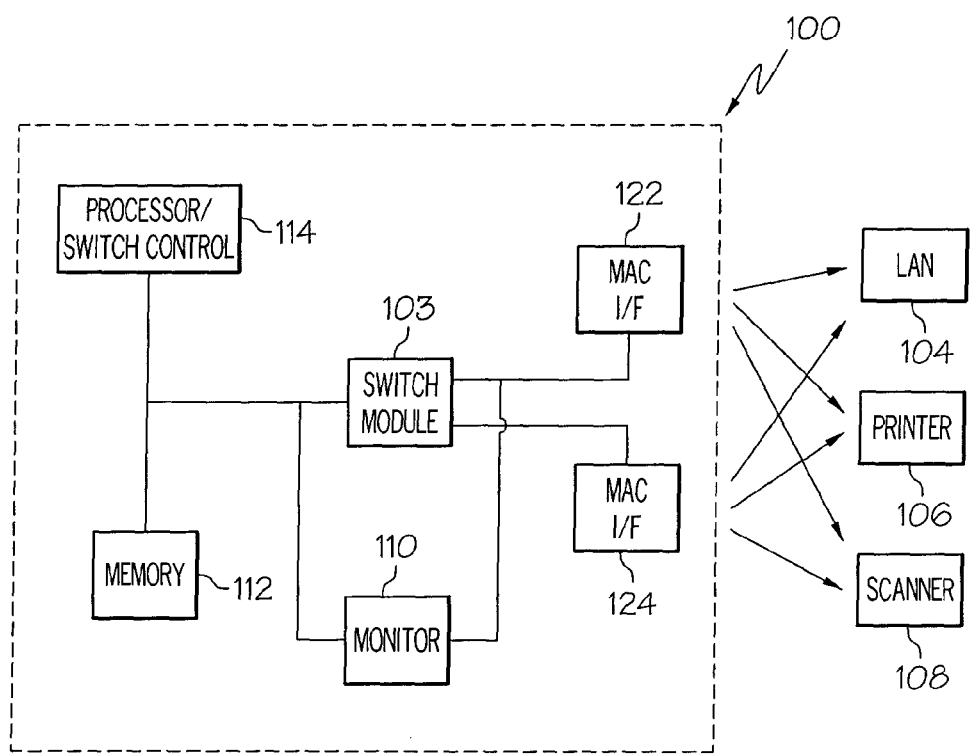
FIG. 1 depicts a block diagram of a multiple MAC system.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

The Institute of Electrical and Electronic Engineers (IEEE) Local Area Network (LAN) standards divide the Open System Interconnection (OSI) data link layer into two sub-layers a Media Access Control (MAC) and a Logical Link Control (LLC) layer. The LLC layer is generally a software function that is responsible for attaching control information to the data being transmitted from a network layer to MAC layer. The MAC layer deals with the media access techniques utilized to control the access to a shared physical medium. The MAC layer is primarily responsible for controlling the flow of data over a network, ensuring that transmission errors are detected, and ensuring that transmissions are appropriately synchronized. Token Ring and Ethernet are two legacy implementations of a MAC layer which use different methods to share the physical media. These two MAC types are typically implemented in an integrated circuit (IC) hardwired because of its technology maturity.

In addition to the current requirements of the different MAC architectures and MAC implementations for various standards, development of the new home local area network (LAN) technology, for example, is causing existing MAC standards to evolve and/or new MAC standards to emerge.

Therefore, it would be advantageous to provide new arrangements based on a programmable MAC implementation architecture. Such arrangements would speed up MAC implementation development, MAC/PHY and MAC/host integration, enable multiple MAC implementations, and increase MAC portability for different applications and platforms. Recent advances in LAN technology utilize multiple MAC channels or connections. Such a configuration provides improved performance because it enables the ability to be concurrently connected (on all layers above MAC layer) to multiple networks over the same physical layer.

These new networking techniques include communicating between mobile devices utilizing virtual multiple media access control (MAC) layers. Such a system can configure different MAC channels as virtual MAC layers where a single piece of hardware can switch to provide the multiple channels. For example, a laptop personal computer (PC) may communicate with a local area network (LAN) utilizing one virtual MAC configuration and communicate with another LAN utilizing a different virtual MAC configuration. This can be thought of as the PC multiplexing communications between two different channels. In such a configuration, all layers of the OSI model can operate concurrently in all of the transmit and receive operations.

A network interface card (NIC) can be a circuit board specializing in network communications that can be installed or placed on-board a computer, so that the computer can communicate with other network compatible devices. Personal computers and workstations on a local area network (LAN) typically contain a network interface card specifically designed for the LAN transmission technology, such as Ethernet. Network interface cards can provide a dedicated, full-time connection to a network and can provide one of more MAC interfaces. However, when multiple MAC interfaces are implemented, the system typically encounters significant latency problems due to the time division between the virtual interfaces. A single NIC can accommodate different MAC configurations, thus, a virtual multi-MAC configuration can be implemented by a NIC.

In order for multi-MAC communications to be perceived occurring "simultaneously" the physical NIC has to periodically switch between channels or MAC channels when transmitting and receiving. Thus, when numerous MAC channels are being utilized the PC must leave the MAC channel that connected and move to the other channels. Generally, the interface can only be on one channel, leaving the other channel(s) unattended. When leaving one MAC channel to operate on another MAC channel with a different MAC address, the NIC can notify the relevant network devices on the current MAC channel that it is leaving the channel. Alternately described, a NIC can notify devices on a particular MAC channel of its fUture absence from the channel by transmitting control signals, then leaving the channel.

Some signals have already been specified in MAC communications for indicating such a temporary absence from network which could be utilized to indicate an absence form a channel. For example, when an interface will be going into a power save mode there is a control instruction that indicates such as change in status often called a power save indicator that the device will be entering a power save mode. Another control signal can be a clear to send signal (CTS) where the interface an get a CTS signal from other devices such that is has control of the network traffic and then can send nothing during this reserved time slot. Another control signal that could be utilized to leave the MAC channel can include a quiet information element (IE).

In accordance with the present disclosure a method of communicating with multiple MAC interfaces is disclosed. The method can include setting up a transmission configuration for a first and a second media access control (MAC) interface, sending a transmission utilizing the first MAC interface and sending a transmission utilizing the second MAC interface. During subsequent communications, communication performance parameters can be determined that are related to the transmissions. Based on the communication performance parameters, the transmission configuration of the first MAC interface and the second MAC interface can be modified to improve communication performance of the system. The modification of the transmission configuration can include changing the bandwidth allocation for each MAC interface. It can be appreciated that not enough switching between interfaces and too much switching between interfaces can both cause undesirable problems and the disclosed arrangements herein can address both of these issues.

Setting up the transmission configuration can include determining an amount of time that will be utilized during transmissions for each interface. Determining the time to allocate between interfaces cap be accomplished in many different ways. For example, determining the allocated time can include selecting a maximum value or the largest value from predefined numbers from various categories or criteria. It is possible to define time allocation using a predefined time quanta (hence—slot), rather then the complete range of values. The numbers to be considered include a minimum number of slots based on system capacity, a ceiling of data allocation per a minimum slot length, a number of intervals in the busiest traffic specification admitted, and a predetermined minimum number of slots.

As a further illustration, determining a communication performance may comprise calculating a number of slots for the transmission by selecting a maximum between a predefined maximum number of slots, a ceiling of allocation of data per the minimum slot length, a number of intervals in the busiest traffic specification admitted and a predetermined minimum number of slots.

The communication performance parameter can be determined utilizing a number of transmit frames lost due to time to live (TTL) or a number of retired frames. The communication performance parameter can also include checking the sequence numbering on the received frames to determine how many frames have been lost or have not made it to their intended destination. The communication performance parameter can also be based on admitted stream characteristics. A lookup table in memory could be utilized to determine if the characteristics provide an acceptable performance. The method can also spread the slot allocation in time when the communication performance parameters are below a predetermined level such that improved communication can be achieved.

In another embodiment a system for communicating is disclosed. The system can include multiple media access control MAC interfaces where each interface can utilize a communication format selected from a plurality of communication formats. The system can also include a network monitor to detect communication performance parameters of the communication formats being utilized and a switch module to switch between communication formats based on the detected communication performance parameters. The system can also include memory to store die detected communication performance parameters. Each MAC interface can be a virtual MAC interfaces that is implemented with a single network interface card. The system can function as a local area network, (LAN).

In another embodiment a linkage between dropped frames in MAC channel communications due to time to live (TTL) or retired frames and voice latency can be utilized to adjust the communication format for multiple virtual MAC interfaces. Adjusting the communication format can include adjusting transmit slot allocation or time spreading slots between different devices such that improved sharing of the virtual MAC interfaces can result. The TTL and retired frames referred to in this disclosure can relate to the MAC layer TTL defined in the IEEE 802.11 TGe specifications.

Typical wireless systems have network interfaces that package data into segments called frames or packets for transmission according to a MAC configuration. Frames can be submitted for transmission to both local and remote or peer machines and such transmissions will typically be robust, subject to the network interface's availability and bandwidth. However, transmitters with multiple interface cards that can provide multiple MAC interfaces (i.e. a multi-MAC system) typically has additional latency in transmitted frames due to the added complexity of switching between MAC channels. As the system toggles between virtual interfaces, a frame cannot be transmitted until the relevant interface is assigned a time slot.

This causes latency because the frame transmission is deferred until the closest slot of its virtual interface is available. Consequently some communication bandwidth may be lost to TTL. Latency can be a very serious problem particularly in a voice transmission environment where too much latency renders the system unusable for the desired task. More specifically, a multi-MAC environment that has too much latency in transmitting and receiving a voice stream will make the audio unintelligible due to packet loss such that users cannot effectively communicate.

An example for high latency caused by multiple virtual MACs is sending a typical voice traffic stream of one packet every twenty milli-seconds. A communicating system may allocate as much as 50 ms slot to each MAC channel. This will produce poor voice quality even though the allocation is by far larger then the required band width due to the latency that originate in the switching pattern.

The disclosed arrangements can also address issues associated with an increase in latency due to multi-MAC operation of a system in time critical operations. Thus a multi-MAC configuration can be implemented where time can be sliced or divided between the MAC interfaces or MAC channels according to predefined bandwidth allocations then the allocation can be adapted during operation based on the requirements of each MAC channel. However, this time slicing can cause increased latency for traffic streams if the bandwidth is not properly time distributed. In one embodiment, the disclosed arrangement provides an algorithm for detecting the latencies of transmission and provides an algorithm for allocating bandwidth for each MAC channel based on time multiplexing.

Referring to FIG. 1, a multi-MAC system 100 is disclosed. The system 100 can include a station 102, an access point or local area network (LAN) 104, a printer 106 and a scanner 108. The station (indicated by a dashed enclosure) could be a personal computer. Specific components of the station, can include a network monitor 110, memory 112, two MAC interface modules 122 and 124 a processor/switch controller 114 and a switch module. The switch module 103 facilitate communications by switching transmit and receive packets or frames between MAC interfaces 122 and 124 and can select the number of slots to be utilized and other stream parameters. The network monitor 110, can monitor transmissions and monitor network utilization and packet loss within the allocated slots as performed by the MAC interfaces 122 and 124.

Every beacon interval, the network monitor 110 can determine then store in memory 112 communication parameters and communication performance parameters of the MAC interfaces 122 and 124. Thus, memory 112 can store and record admitted streams, used stream format and recent performance parameters as determined by the network monitor 110. Processor 114 can assist in erasing old communication performance data to make room for the new performance data in a stack type configuration. Based on the historical communication performance, the processor 114 can adjust the number of slots that should be allocated to each MAC interface module 122 and 124. Although only two MAC interfaces modules are illustrated, many additional MAC interfaces could be utilized and the disclosed system could determine how to allocate slots between a plurality of, or multiples MAC interfaces (not shown).

In one embodiment, three specific communication parameters can be detected/calculated by monitor 110. These three parameters include receive (RX) latency, transmission (TX) latency and admitted streams characteristics. Transmit latency can be detected by the number of frames dropped by TTL. Receive latency can be detected by number of non-consecutive received frames that occur in a given time period assuming the link is good and that the frames that are dropped is due to TTL. Admitted stream characteristics are defined in IEEE 802.11e.

In one embodiment, the processor 114 can process data that is included in the frame and utilize other circuitry to calculate these parameters. For example, to calculate Rx latency, the monitor and the processor can determine if frames are received with non-consecutive sequence number after BACK reordering of frames. BACK is a common reference to "Block acknowledgement" as defined in IEEE 802.11e & IEEE 802.11n. The "missing frames" can be assumed as lost or being discarded due to receive (RX) time to live (TTL). The network monitor 110 can collect the number of RX TTL lost frames within a predetermined time interval. If the number of missing frames due to RX TTL is greater then a predefined number within the time interval, (the number being stored in memory 112) Rx latency can be utilized by the switch module 103 to increase the slot allocation in subsequent transmission configurations. The processor 114 can also perform TX latency calculations. If the number of TX frames that are dropped due to TTL within predefined time interval is greater than a predetermined number then TX latency can be utilized to increase the number of slots allocated by the switch module 103.

In a traditional configuration, an application can request a type of data stream to be utilized in communication with another device in a wireless local area network, and when the request is allowed it is referred to as an "admitted stream." In the disclosed arrangements the admitted stream's characteristics can be stored in the memory 112. Memory 112 could be implemented as cache memory. Based on the detected communication performance parameters, such as the two latency parameters and the admitted streams, the switch module 130 can switch between MAC interfaces 122 and 124. The switching can include allocating more of less time slots (equivalent to bandwidth units) to each MAC interface 122 or 124 such that the process that needs the additional bandwidth can receive such bandwidth and operate more effectively. The monitor 100 can monitor the switching between interfaces 122 and 124 and the predefined streams of traffic to determine and schedule packets and streams in a format that produces an improved communication performance. The monitor 110 can monitor how much traffic is actually being passed on each MAC interface 122 and 124. This can serve as a parameter for increasing/decreasing the bandwidth allocation (find slots that were not utilized).

Figure 2:
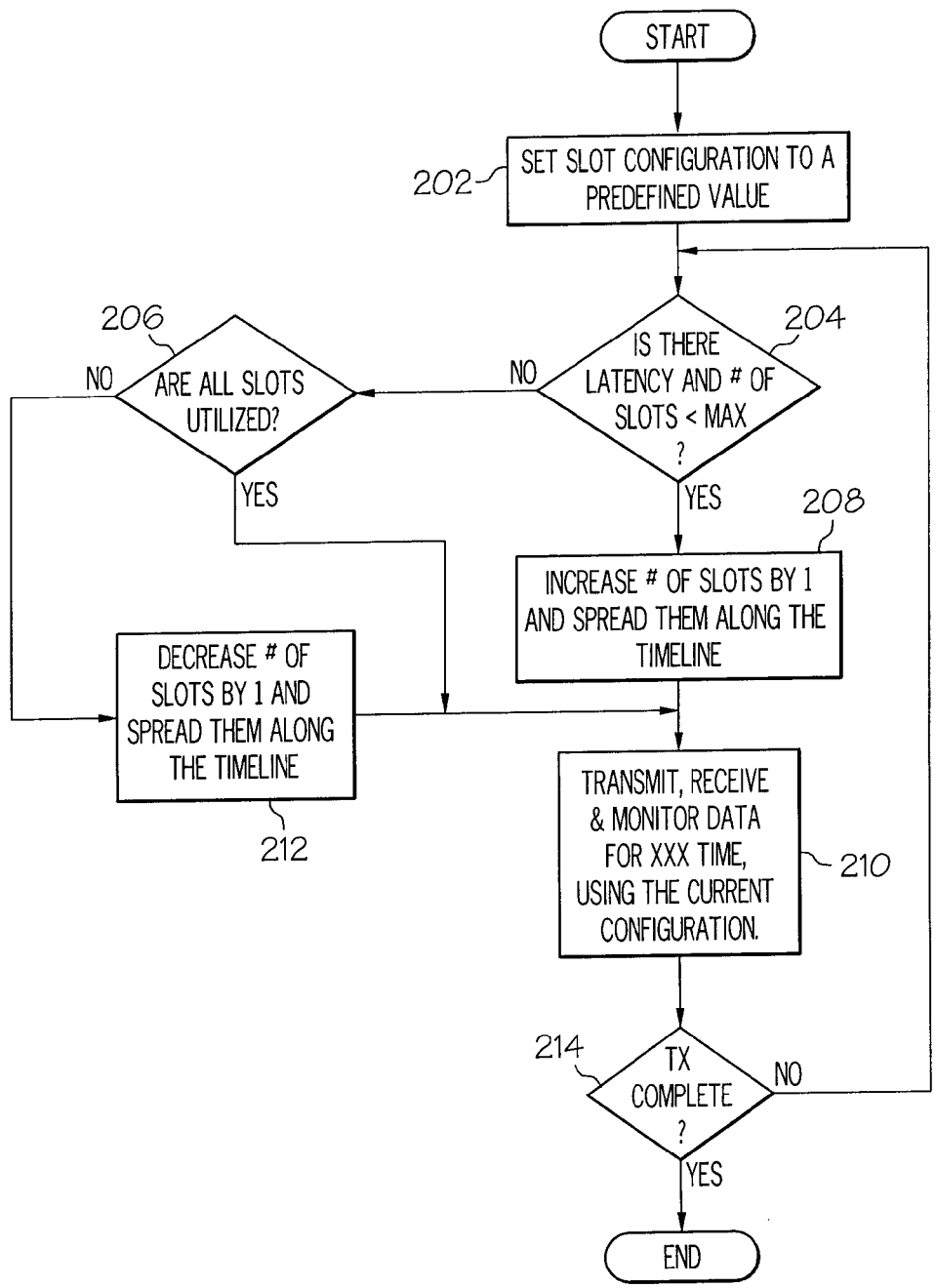
FIG. 2 is a flow diagram of a method of controlling MAC interfaces.

Referring to FIG. 2, a method for network communications is disclosed. As illustrated in block 202, the number of slots for a particular MAC interface starting a communication exchange can be determined. Determining the number of slots can be accomplished in a number of ways, each without parting from the scope of the present disclosure. In one embodiment, the number of slots can be calculated, and in other embodiments the number of slots can be set to a predetermined number or a predefined value. The number or value could be retrieved from a memory location. In one embodiment, the predetermined number can be a number representing the same number of slots that were utilized in the last, preceding or previous transmission configuration. In another embodiment, the number of slots can be calculated. This procedure for determining the number of slots can be done for each interface.

The calculation to determine a number of slots to be utilized by an interface for a communication session can include selecting a minimum number from the following set of criteria: a predefined maximum number of slots that, under nominal conditions, provides acceptable communication; a number of intervals in the busiest traffic specification (TSPEC), admitted by the system and a predetermined number of slots as determined by a user. Some admitted specifications will require more slots because they are more complicated and time intensive and thus, these formats will require a larger number of admitted slots. This larger number of admitted slots can be utilized as the maximum number.

As illustrated in block 204, it can be determined if there is a latency than is greater that a predetermined latency (i.e. a transmit (TX) latency or a receive (RX) latency) and the number of slots allocated is not at a maximum. If there is a transmit or receive latency and slots are available for allocation then it can be determined if all slots are utilized as illustrated in block 206. If all slots are utilized, then the process can proceed to block 210 and data can be transmitted. If there are available slots, the number of slots can be decreased by one and the slots can be spread along the timeline as illustrated by block 212. At decision block 204, when there is no latency and the number of slots is not maximized then the communication structure can be modified such that the number of slots utilized by the MAC interface can be incremented by one and the slots can be spread along the timeline as illustrated by block 208.

As illustrated by block 210 data can be transmitted utilizing the selected slot configuration and as illustrated by block 210. At decision block 214 it can be determined if the transmission is complete. If the transmission is not complete, then the process can revert back to block 204 where it can be determined if there is a transmit or receive latency. If the transmission is completes the process can end.

The disclosed arrangements strides toward the best user experience by reducing the latency of frames by implementing switching overhead and power management. However, it is very flexible and adaptive and thus, can fit into nearly any communication environment. In accordance with the present disclosure, detecting latency then spreading the slot allocation in time to improve performance that has been degraded because of latency issues can be accomplished. Such a spreading can be utilized in accordance with the Institute of Electrical and Electronic Engineers (IEEE) 802.11 a/g/n wireless network interface card (NIC) specification.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present arrangements, represent embodiments of the present disclosure.

The disclosed embodiments can take the form of an entirely hardware embodiment, an entirely software embodiment or an embodiment containing both hardware and software elements. In one embodiment, the disclosure is implemented in software, which includes but is not limited to firmware, resident software, microcode, etc. Furthermore, some disclosed arrangements can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The control module can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present disclosure contemplates methods, systems, and media that can automatically tune a transmission line. It is understood that the form of the arrangements shown and described in the detailed description and the drawings are to be taken merely as examples. It is intended that the following claims be interpreted broadly to embrace all the variations of the example embodiments disclosed.

What is claimed is:

1. A method of communicating comprising:
   setting up a transmission configuration for a first and a second media access control (MAC) interface;
   sending a first transmission utilizing the first MAC interface;
   sending a second transmission utilizing the second MAC interface;
   determining a communication performance parameter related to at least the first transmission, wherein determining the communication performance parameter comprises detecting a transmission latency associated with the first transmission, wherein determining a communication performance parameter comprises calculating a number of slots for the transmission by selecting a maximum between a predefined maximum number of slots, a ceiling of allocation of data per a minimum slot length, a number of intervals in a busiest traffic specification admitted and a predetermined minimum number of slots; and
   modifying the transmission configuration of first MAC interface based on the communication performance, wherein modifying the transmission configuration comprises increasing slots allocated for the first transmission in response to detecting the transmission latency associated with the first transmission while less than a maximum number of slots are allocated for the first transmission.

2. The method of claim 1, wherein setting up the transmission configuration comprises determining a number of slots.

3. The method of claim 1, wherein detecting the transmission latency comprises determining one of a number of transmit frames lost, based on a time to live parameter or a number of retired frames.

4. The method of claim 1, wherein detecting the transmission latency comprises determining a number of receive frames lost based on a time to live parameter.

5. The method of claim 1, wherein the first and the second transmission utilize the same physical interface.

6. The method of claim 1, wherein the communication performance parameter is based on admitted streams characteristics.

7. The method of claim 1, further comprising spreading the slots allocated along a timeline when the communication performance parameter is below a predetermined level.

8. The method in accordance with claim 7, where spreading is achieved in accordance with the Institute of Electrical and Electronic Engineers (IEEE) 802.11a/g/n wireless network interface card (NIC) specification.

9. The method of claim 1, wherein determining the communication performance parameter comprises detecting no transmission latency associated with the first transmission.

10. The method of claim 9, wherein modifying the transmission configuration comprises decreasing slots allocated for the first transmission in response to detecting no transmission latency associated with the first transmission.

11. A system for communicating comprising:
    a first media access control interface to utilize a communication format from a plurality of communication formats;
    a second media access control interface to utilize a communication format from the plurality of communication formats;

a network monitor to detect communication performance parameters of communication formats utilized by the first and second media access control interfaces, wherein detecting the communication performance parameter formats comprises detecting a transmission latency associated with a first transmission via the first media access control interface; and a switch module to switch the communication format utilized by the first and second media access control interfaces based on the detected communication performance parameters, wherein switching the communication format comprises increasing slots allocated for the first transmission in response to detecting the transmission latency associated with the first transmission while less than a maximum number of slots are allocated for the first transmission, the system to determine a communication performance parameter by calculating a number of slots for the transmission, wherein the calculating comprises selecting a maximum between a predefined maximum number of slots, a ceiling of allocation of data per a minimum slot length, a number of intervals in a busiest traffic specification admitted and a predetermined minimum number of slots.

12. The system of claim 11, fUrther comprising memory to store the detected communication performance parameters.

13. The system of claim 11, wherein the first and second MAC interfaces are virtual MAC interfaces.

14. The system of claim 11, further comprising a local area network interface to communicate with the system.

15. The system of claim 11, further comprising a processor coupled to the switch.

16. The system of claim 11, where the first MAC interface is a network interface card.

17. The system of claim 11, wherein detecting the communication performance parameter formats comprises detecting no transmission latency associated with the first transmission via the first media access control interface.

18. The system of claim 17, wherein switching the communication format comprises decreasing slots allocated for the first transmission in response to detecting no transmission latency associated with the first transmission.

* * * * *

UNITED STATES PATENT AND TRADEMARK OFFICE
CERTIFICATE OF CORRECTION

PATENT NO. : 7,724,683 B2
APPLICATION NO. : 11/694998
DATED : May 25, 2010
INVENTOR(S) : Yoav Moratt et al.

It is certified that error appears in the above-identified patent and that said Letters Patent is hereby corrected as shown below:

In column 10, line 4, in claim 12, delete "fUrther" and insert -- further --, therefor.

Signed and Sealed this

Twenty-first Day of September, 2010

David J. Kappos
*Director of the United States Patent and Trademark Office*